United States Patent [19]
Saito et al.

[11] Patent Number: 5,199,081
[45] Date of Patent: Mar. 30, 1993

[54] SYSTEM FOR RECORDING AN IMAGE HAVING A FACIAL IMAGE AND ID INFORMATION

[75] Inventors: Tutomu Saito, Yokohama; Akito Iwamoto, Kamakura, both of Japan

[73] Assignee: Kabushiki Kaisha Toshiba, Kawasaki, Japan

[21] Appl. No.: 627,757

[22] Filed: Dec. 14, 1990

[30] Foreign Application Priority Data

Dec. 15, 1989 [JP] Japan .................................. 1-323928
Oct. 24, 1990 [JP] Japan .................................. 2-287464

[51] Int. Cl.⁵ ......................... G06K 9/34; G06K 9/42; G06K 9/20; G06K 5/00
[52] U.S. Cl. ..................................... 382/2; 382/3; 382/9; 382/47; 382/61; 235/380; 395/149
[58] Field of Search ............... 382/2, 3, 9, 47, 61; 283/77, 37; 235/487, 380; 395/145, 147, 149

[56] References Cited

U.S. PATENT DOCUMENTS

| 4,180,207 | 12/1979 | Lee | 382/2 |
| 4,554,591 | 11/1985 | Kee | 382/2 |
| 4,589,144 | 5/1986 | Namba | 382/61 |
| 4,771,473 | 9/1988 | Sugiura | 382/47 |
| 4,811,408 | 3/1989 | Goldman | 382/2 |
| 4,949,287 | 9/1990 | Yamaguchi et al. | 395/147 |
| 4,951,233 | 8/1990 | Fujiwara et al. | 395/147 |
| 5,025,396 | 6/1991 | Parks et al. | 395/147 |
| 5,025,399 | 6/1991 | Wendt et al. | 235/380 |

FOREIGN PATENT DOCUMENTS 0081767 6/1983 European Pat. Off. .
0122430 10/1984 European Pat. Off. .

OTHER PUBLICATIONS

Patent Abstracts of Japan, vol. 13, No. 512(M-893) Nov. 16, 1989, & JP-A-1 206 098, Aug. 18, 1989, T. Nozu, et al.,: "ID Card Preparation".

Primary Examiner—David K. Moore
Assistant Examiner—Michael Cammarata
Attorney, Agent, or Firm—Oblon, Spivak, McClelland, Maier & Neustadt

[57] ABSTRACT

A system comprises a form of a predetermined format having an area for the facial image, an area for a monochrome image constituting a part of the ID information and an area for a character image constituting the other part of the ID information, image reader for reading the image on the form to output image signals from the areas, processing units for processing the image signals from the areas output from the image reader to fit the recording format, and a recorder responsive to image signals processed by the processing units for recording the facial image, the monochrome image and the character image.

4 Claims, 12 Drawing Sheets

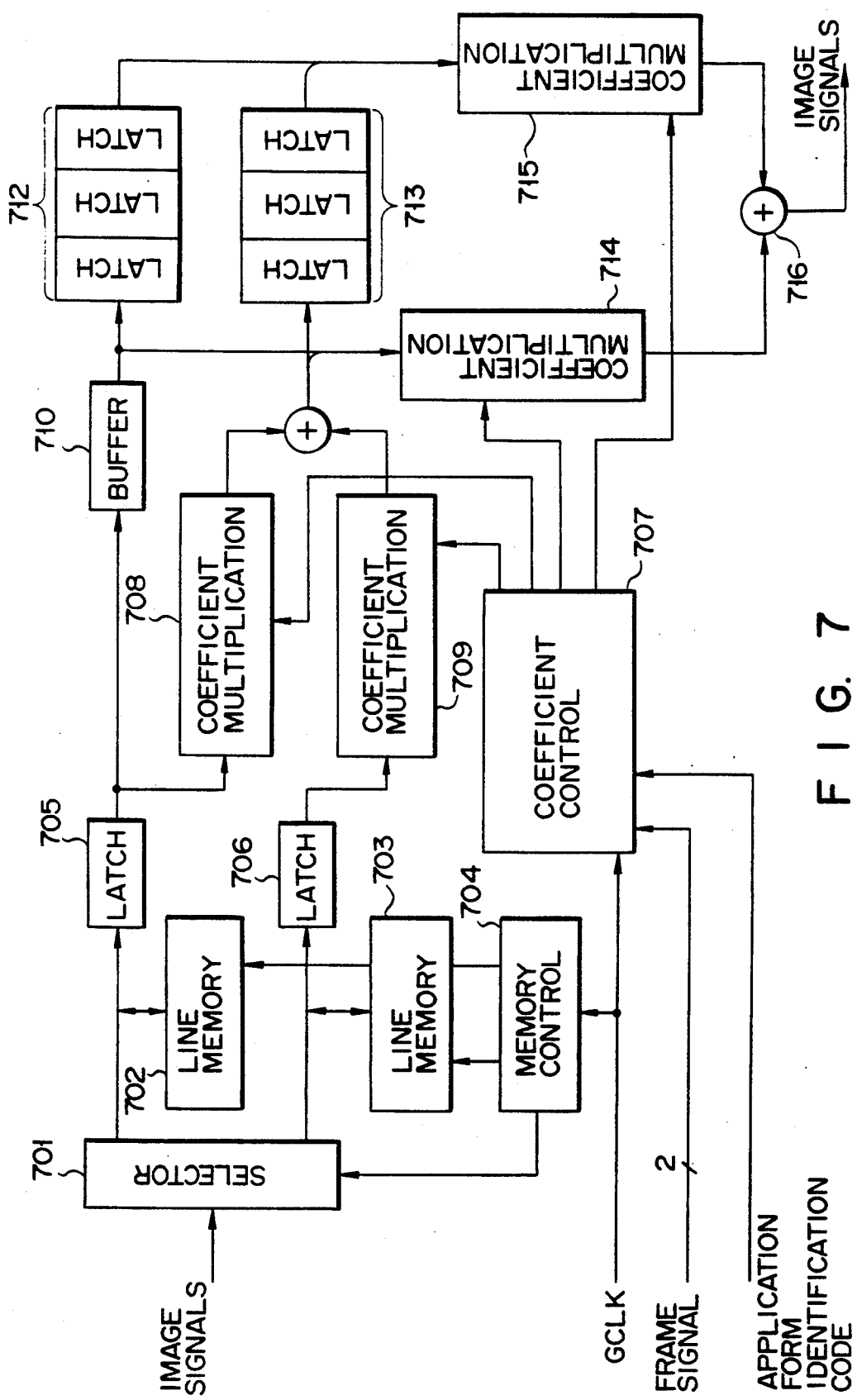
F I G. 7

SYSTEM FOR RECORDING AN IMAGE HAVING A FACIAL IMAGE AND ID INFORMATION

BACKGROUND OF THE INVENTION

1. Field of the Invention

The present invention relates to an image recording system and, more particularly, to a system for recording images including a facial photograph and ID information which is used to prepare ID cards such as drivers' certificates, identification cards, gate-entry permits and bankbooks, or printed matter such as brochures.

2. Description of the Related Art

Recording (printing) of an image having a facial photograph and ID information is utilized for preparing drivers' certificates, identification cards, gate-entry permits, bankbooks or other certificates. In general, a facial photograph covered with a transparent seal is attached to such a certificate and moreover the name, the date of birth and the sex of its owner, the issue data, the issue number, etc., are printed thereon as ID information.

Heretofore, the preparation of such a certificate, for example, a driver's certificate, has been performed by the following procedure. First, an applicant fills out a prescribed application form and attaches a photograph of his or her face to the form for submission to the window of an administrative office. At the office which accepted the application form, the name, the date of birth and the sex of the applicant, the issue data, an issue number, etc., are typed on certificate paper. Subsequently an applicant's facial photograph which was prepared separately is attached to the certificate paper. Finally the attached photograph is coated with a transparent seal. These certificate preparing steps are each performed independently, thus decreasing the efficiency of the certificate preparing work. Even at an office in progress of computerization, the fact is that an applicant has to wait for several hours from the time when an application form is accepted before a certificate is actually issued. In addition, the submission of plural photographs is often required, one for a certificate and the other for an application form.

With a conventional improved system for issuing and updating drivers' certificates, on the other hand, a photography column (in which name, date of birth, sex, issue date and issue number are entered in a prescribed layout) on an application form and an applicant's photograph is optically synthesized on silver halide photographic film. Next, the film is developed and then printed. A resultant photograph is cut in a suitable size and then subjected to laminating, whereby a driver's certificate is completed.

In Japanese Unexamined Patent Publication No. 1-20609, there is disclosed an ID card preparing system in which the face of an applicant is taken by a television camera, a resulting image signal is electronically combined with ID information and then subjected to layout processing, and the result of the processing is printed.

With the conventional systems, the driver's certificate issuing work includes photographing of an applicant's face. For this reason, the time required to issue a driver's certificate cannot sufficiently be shortened because of photographing time, waiting time, etc. In addition, a photographing space and a waiting space are needed. In principle, the photographing of a face is often permitted only once in terms of efficiency and cost. As a result, a facial photograph with an expression that an applicant does not like may be recorded on a driver's certificate. In such a case, the applicant will feel pain during the valid period of the certificate which is typically several years.

SUMMARY OF THE INVENTION

It is therefore an object of the present invention to provide a system for recording an image having a facial image and ID information which is adapted to issue a certificate, such as a driver's certificate, simply and efficiently on the basis of a facial image and ID information on a form such as an application form.

According to a first aspect of the present invention, a form having an area for a facial image, an area for a monochrome image constituting a part of ID information and an area for a character image constituting the other part of the ID information is prepared. The form is read by an image reader to produce image signals from the areas. The image signals from the areas output from the image reader are entered into processing units so that they are processed to a recording format. The processed image signals are sent to a recorder where the facial image, the monochrome image and the character image are recorded.

According to a second aspect of the present invention, a form is provided with an area for an image which is a part of a facial image, a monochrome image constituting a part of ID information and a character image constituting the other part of the ID information. An image entry unit is provided which is adapted to enter an image signal of an image which is the other part of the facial image, the monochrome image and the character image. The image signals from the image reader and the image entry unit are applied to a processing unit and processed to fit a recording format.

For example, in a case where a certificate, such as a driver's certificate, is made out, on an application form prepared by an applicant a color or monochrome photograph of the face of the applicant is attached, the signature is made by the applicant, and as ID information other than the signature, for example, the address, the date of birth and the sex are written in handwriting or typewriting. The images on the application form are read collectively. The resulting image signals are separated for each of the areas and then processed. Image processing is performed for each area in accordance with the layout and size of areas of a certificate to be issued. The processed image signals are sent to a printer, or a recorder where a certificate is printed and issued. Where an image signal read from a recording medium which may be of any type is entered in addition to an image signal obtained by reading the application form, these image signals are processed in the same manner. This will eliminate the need for a step of photographing the face of an applicant after submission of an application form and permit the simultaneous processing of all information to be printed on the application form, whereby the time it takes to issue a certificate is drastically reduced. A photograph of the face which is printed on the certificate can be chosen by the applicant.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 7 is a block diagram of the line density conversion circuit of FIG. 4;

DETAILED DESCRIPTION OF THE PREFERRED EMBODIMENTS

Figure 1:
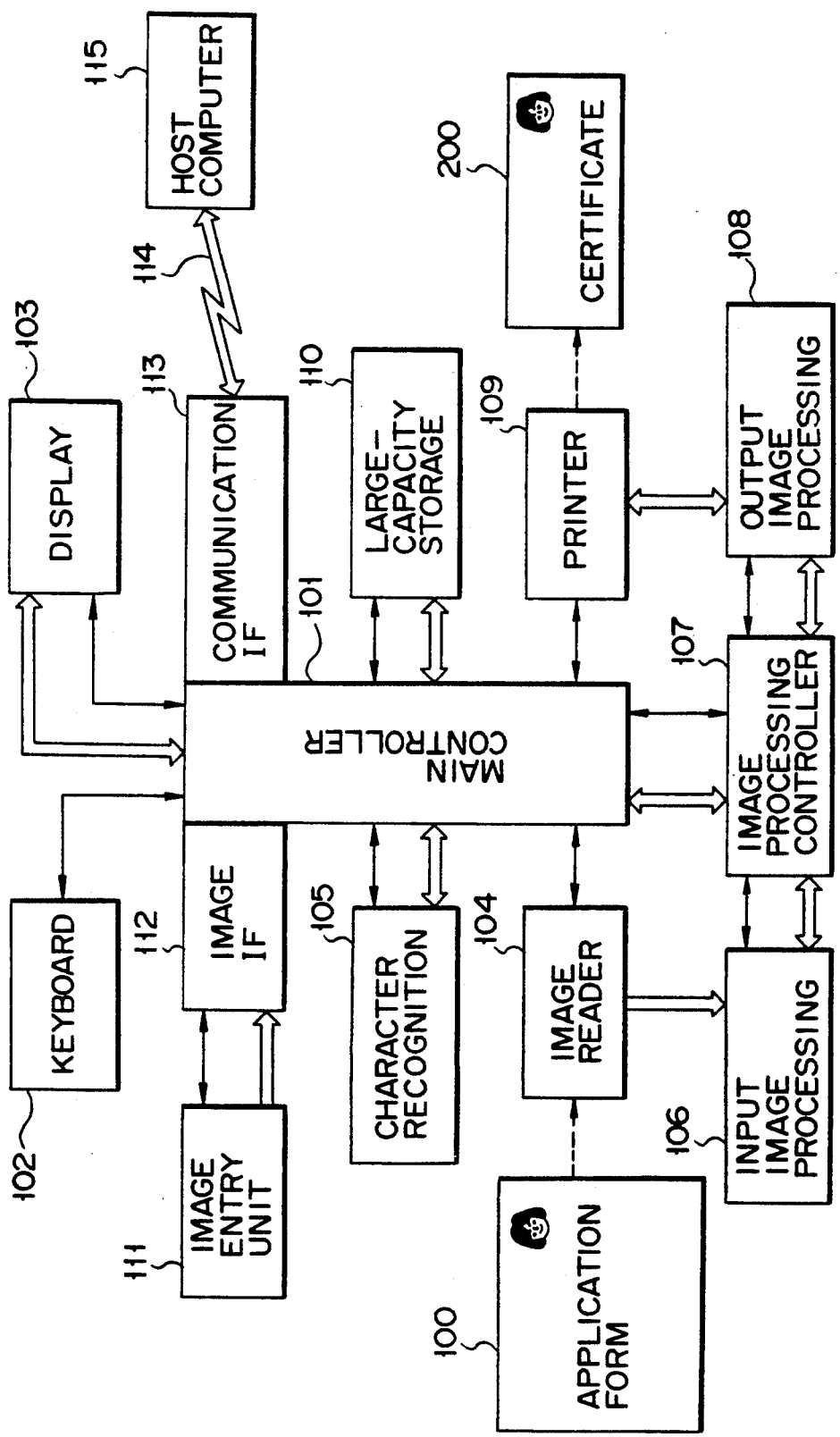
FIG. 1 is a block diagram of an image recording system embodying the present invention.

Referring now to FIG. 1 there is illustrated a system for reading an image on an application form 100, processing a resulting image signal and preparing and issuing a certificate 200 such as a driver's certificate. This system is composed of a main controller 101 consisting of a central processing unit (CPU), a keyboard 102, a display unit 103, an image reader 104, a character recognition unit 105, an input image processor 106, an image processing control unit 107, an output image processing unit 108, a printer 109, a large-capacity memory 110, an image entry unit 111, an image interface (IF) 112 and a communication interface 113. The communication interface 113 is connected to a host computer 115 installed in an office by a communication line 114. In FIG. 1, heavy lines indicate multiple-bit data lines and fine lines indicate control lines.

Figure 2:
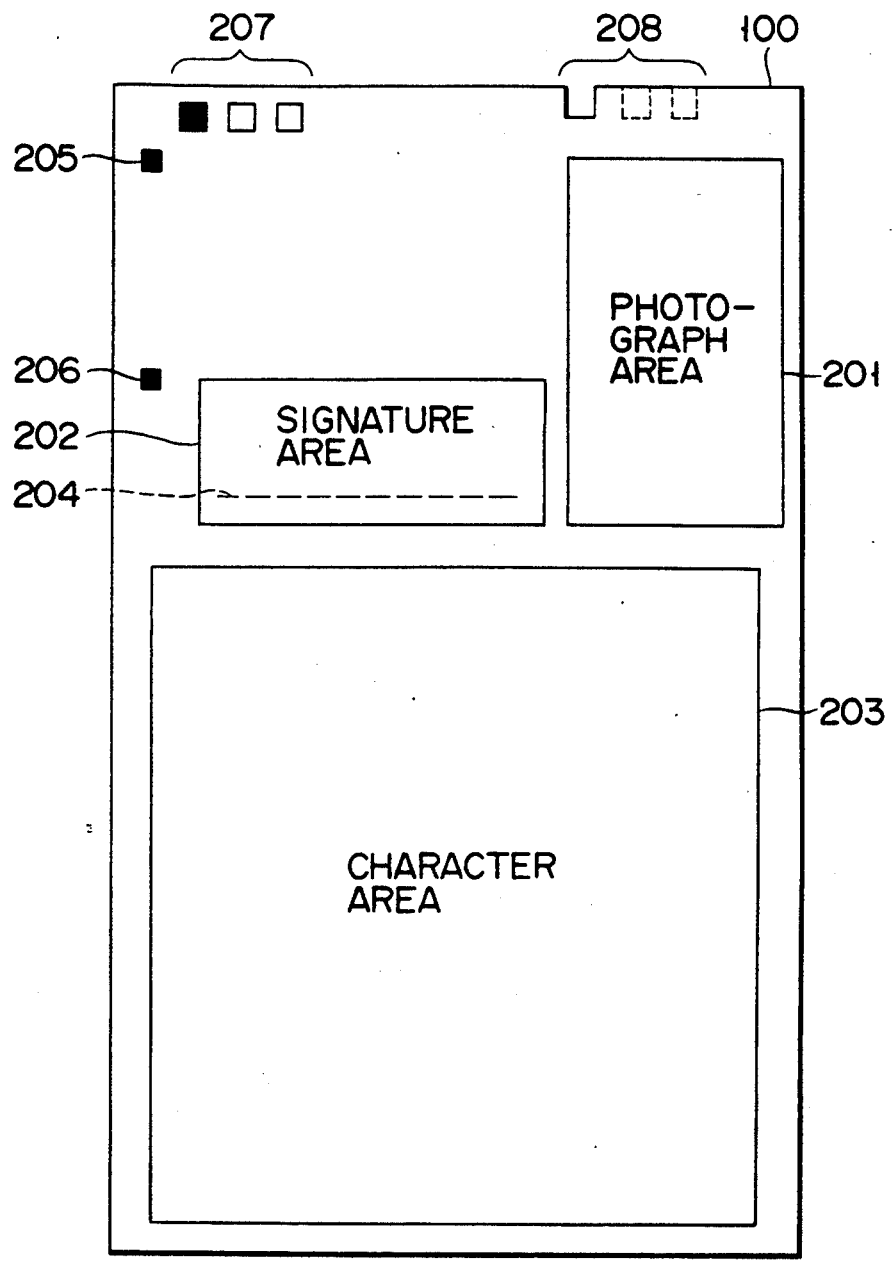
FIG. 2 illustrates the layout of various areas of the application form shown in FIG. 1.

As illustrated in FIG. 2, the application form 100 has three types of image areas: a photograph area (facial image area) 201 on which a color photograph or a monochrome photograph of the face of an applicant is pasted; a signature area (monochrome image area) 202 on which the applicant's puts his or her signature; and a character area (character image area) 203 in which the applicant fills out characters forming ID information other than his or her signature in handwriting or in typewriting. The signature area 202 is provided with a reference line 204. At the left-hand edge of the application form 100 are printed reference marks 205 and 206 for providing reference coordinates used for frame detection which will be described later. The mark 205 provides the reference coordinates for frame detection of the photograph area 201, while the mark 206 provides the reference coordinates for frame detection of the signature area 202. At the top edge of the application form 100 are formed a printed mark 207 and a notch or cutout mark 208 which are adapted to identify the type of the application form. In the example of FIG. 2, each of the marks 207 and 208 has three unit mark areas and thus can represent eight formats of application forms in digital code.

Plural formats are prepared for application forms in advance. The formats differ from one another in the layout of the areas 201, 202 and 203 according to the purposes of application (i.e., new issue, reissue, revision/addition, cancellation of registration, urgent issue. etc.). In order for an applicant not to use a wrong application form or for a clerk at the window to make no procedural mistakes, a printing color (in the character area 203 it is the subject of dropout color processing) indicating a frame such as a character frame may be changed for each format. An application form is selected from among those plural formats according to the purpose of application. Application forms may be processed collectively for each of application purposes or application forms for various purposes may be processed randomly. In either configuration of processing, flexible measures can be taken by identifying the format of application form 100. The format of application form 100 may be identified by an operator which enters it from the keyboard 102 or automatically by reading the marks 207 and 208. The former is effective in a case where application forms of the same format are processed collectively to some extent. Where application forms of various formats are mixed, the latter automatic identification is effective. The automatic identification is used in the present embodiment.

The operation of the system of FIG. 1 will be described briefly. The application form 100 of FIG. 2 prepared by an applicant is submitted to the window of the administrative office. The application form is set in the image reader 104. The format of the application form is identified by an application form identifying device, which will be described later, provided in the image reader 104, whereby an application form identification code is produced which is, in turn, sent to the main controller 101. (The determination of what type of application form identification code is used to define the format of the identified application form may be made arbitrarily in system design.) Subsequently, an image on the application form 100 is read by the image reader 104, whereby an image signal is produced. The image signal is in turn applied to the input image processing unit 106. The input image processing unit separates the incoming image signal into image signals corresponding to the areas 201, 202 and 203 under the control of the image processing controller 107 and processes each of the area image signals in a predetermined fashion.

The results of processing are transferred from the input image processing unit 106 to the main controller 101 via the image processing controller 107. The main controller 101 selects image data from the character area 203 of FIG. 2 from among the processing results output from the input image processing unit 106 and transfers it to the character recognition unit 105. The character recognition unit 105 performs character recognition on the basis of two-stage processing using the known multiple similarity method and feature a structure matching method and transfers the results of recognition to the main controller 101 as character code data. The main controller 101 permits the display unit 103 to display a character image specified by the character code data from the character recognition unit 105, the photographic image in the facial image area 201 and the signature image in the signature area 202.

The operator checks the display contents of the display unit 103 with the contents of the application form 100. When the display contents for the character image is found to be different from the contents of the character area 203 of the application form 100, the operator decides that a mistake was made by the image reader 104 or the character recognition unit 105. In this case, the operator makes corrections or enters through the keyboard 102 a command to cause the image reader 104 to read the image again. Where the certificate 200 is reissued or updated, the contents entered in the host computer 115 or the large-capacity memory 110 which serves as a data base as well as the facial photograph image in the facial photograph area 201 and the signature image in the signature area 202 are displayed by the display unit 103. The operator checks the contents of application with the display contents and makes corrections if the need arises. At this time, the operator communicates with the host computer 115 online through the main controller 101 as needed so as to check various pieces of information including credit inquiry information and accept an issue number. Subsequently the operator enters a work item, such as new issue, reissue, correction/addition, cancellation of registration or urgent issue, into the main controller 101 through the keyboard 102 to inform the host compute of it and accepts instructions needed to continue the work. In the case of cancellation of a registration, the work is terminated at this point.

The image data, which has been subjected to check and correction in that way, is transferred to the large-capacity memory unit 110 to be stored therein temporarily and then transferred to the output image processing unit 108 via the image processing control unit 107. Here a preset recording format corresponding to the work item identified by the application form identification code is set to the image data stored in the large-capacity memory unit 110. The output image processing unit 108 performs a process of characteristic matching between the recording format of the certificate 200 and that of the printer 109 on the image data transferred from the large-capacity storage unit 110 via the main controller 101 and the image processing controller 107. The image data transferred from the main controller 101 to the large-capacity storage unit 110 may be transferred to the output image processing unit 108 simultaneously. The printer 109 is responsive to the output image processing unit 108 to print the facial image and the ID information of the applicant on a predetermined sheet of paper, whereby the certificate 200 is prepared. The completed certificate 200 is then handed to the applicant.

Next, each section of the system of FIG. 1 will be described in detail

Figure 3:
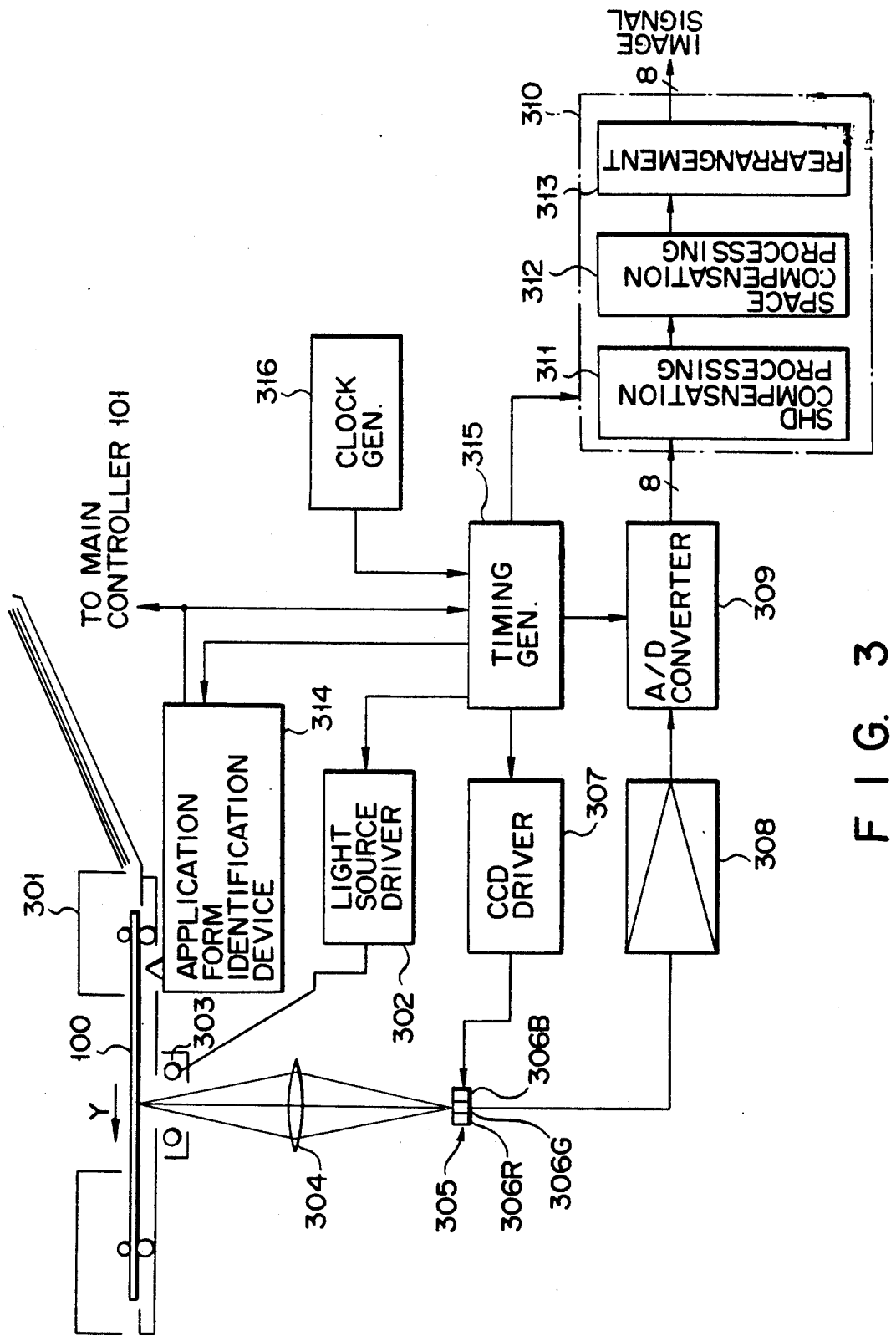
FIG. 3 illustrates an arrangement of the image reader of FIG. 1.

FIG. 3 illustrates an arrangement of the image reader 104. The image reader is adapted to read an image in each of the areas 201, 202, 203 of the application form 100 by one scan. The image reader has a sufficient read-out resolution for the facial photograph of the applicant on the photography area 201 which requires the highest resolution and moreover is arranged to be capable of reading a color photograph as well as a monochrome photograph. In FIG. 3, the application form 100 is fed in the direction of an arrow Y (the direction of sub-scanning) at a constant velocity by a feeding mechanism 301. This feeding operation corresponds to the sub-scanning. The surface of the application form 100 is illuminated by a light source 303 driven by a light-source driving circuit 302, and an image on the surface is imaged onto a solid-state color image sensor 305 by an imaging lens 304. By the color image sensor 305 the image on the application form 100 is read at a resolution of, for example, 16 dots/mm.

The color image sensor 305 is composed of three CCD line image sensors 306R, 306G and 306B which are provided with R(red), G(blue) and G(green) color filters, respectively, each of the line image sensors being comprised of a photoelectric conversion array and a charge-transferring CCD array. Each of the photoelectric conversion arrays of the line image sensors 306R, 306G and 306B is disposed vertically (in the main scanning direction) with respect to the drawing sheet. As the color image sensor 305, another type of CCD color image sensor may be used in which R, G and B color filters are provided in a dot sequential manner. The color image sensor 305 is driven by a CCD driving circuit 307 to produce electric signals for separated R, G and B light components, namely, line-sequential R, G and B color image signals corresponding to the image incident on the sensor on the basis of the main scanning in the direction along the length of each of the photoelectric conversion arrays. Each of the color image signals is converted to a digital signal of, say, 8 bits by an A/D converter 309 and then applied to an image compensation circuit 310.

The image compensation circuit 310 comprises a shading (SHD) compensation circuit 311, a space compensation circuit 312 and a rearrangement circuit 313. The shading compensation circuit 311 performs level compensation and normalization on the image signals so as to compensate for variations in illumination of the application form 100 by the light source 303, variations in amount of light in the imaging optical system including the lens 304 and variations in sensitivity of the color image sensor 305. The space compensation circuit 312 is adapted to compensate for spatial deviation of the CCD line image sensors 306R, 306G and 306B with respect to each other in the main scanning direction. The rearrangement circuit 313 is adapted to rearrange the line-sequential R, G and G color image signals in dot-sequential color image signals. The arrangement of each of the compensation circuits is known and hence its detailed explanation is omitted herein. The configuration of the image compensation circuit 310 may be modified according to the structure of the color image sensor 305.

An application form identification device 314 reads the marks 207 and 208 in FIG. 2 to identify the format of the application form 100. The identification device 314 comprises six non-contact optical sensors which are registered with the six unit mark areas of the marks 207 and 208 and an electronic circuit for performing a logical operation on six sensor outputs. Each sensor senses the state (the presence or absence of printing or a notch) of a corresponding unit mark area by utilizing a difference between amounts of reflected light from the background portion and the mark portion, thereby producing a signal at a logic level corresponding to the state of the unit mark area. An application form identification code is produced by the electronic circuit which performs a logical operation (basically logical product) on output signals of the three sensors corresponding to the mark 207 and output signals of the three sensors corresponding to the mark 208. The application form identification code is sent to the main controller 101 of FIG. 1. The combined use of the mark 207 and 208 will increase the number of formats of application forms which can be identified. Where the number of formats of application forms which can be identified may be small, either of the marks 207 and 208 may be used.

A timing generator 315 operates with a basic clock from a clock generator 316 to produce various timing signals necessary for the light source driving circuit 302, the CCD driving circuit 307, the A/D converter 309, the image compensating circuit 310 and the application form identification device 314 under the control of the main controller 101 of FIG. 1.

In this way the image reader 104 reads images in all necessary areas of the application form 100 at a resolution of 16 dots/mm and produces dot-sequential R, G, B color image signals with $2^8 = 256$ gradation levels by means of one image reading operation comprised of main scanning and sub-scanning. The color image signals are applied to the input image processing unit 106 of FIG. 1. The input image processing unit 106 performs the above-described processes on the input color image signals until check and correction are made by the operator, and the permission for issue and various management numbers such as an issue number, etc., are received from the host computer 115.

Figure 4:
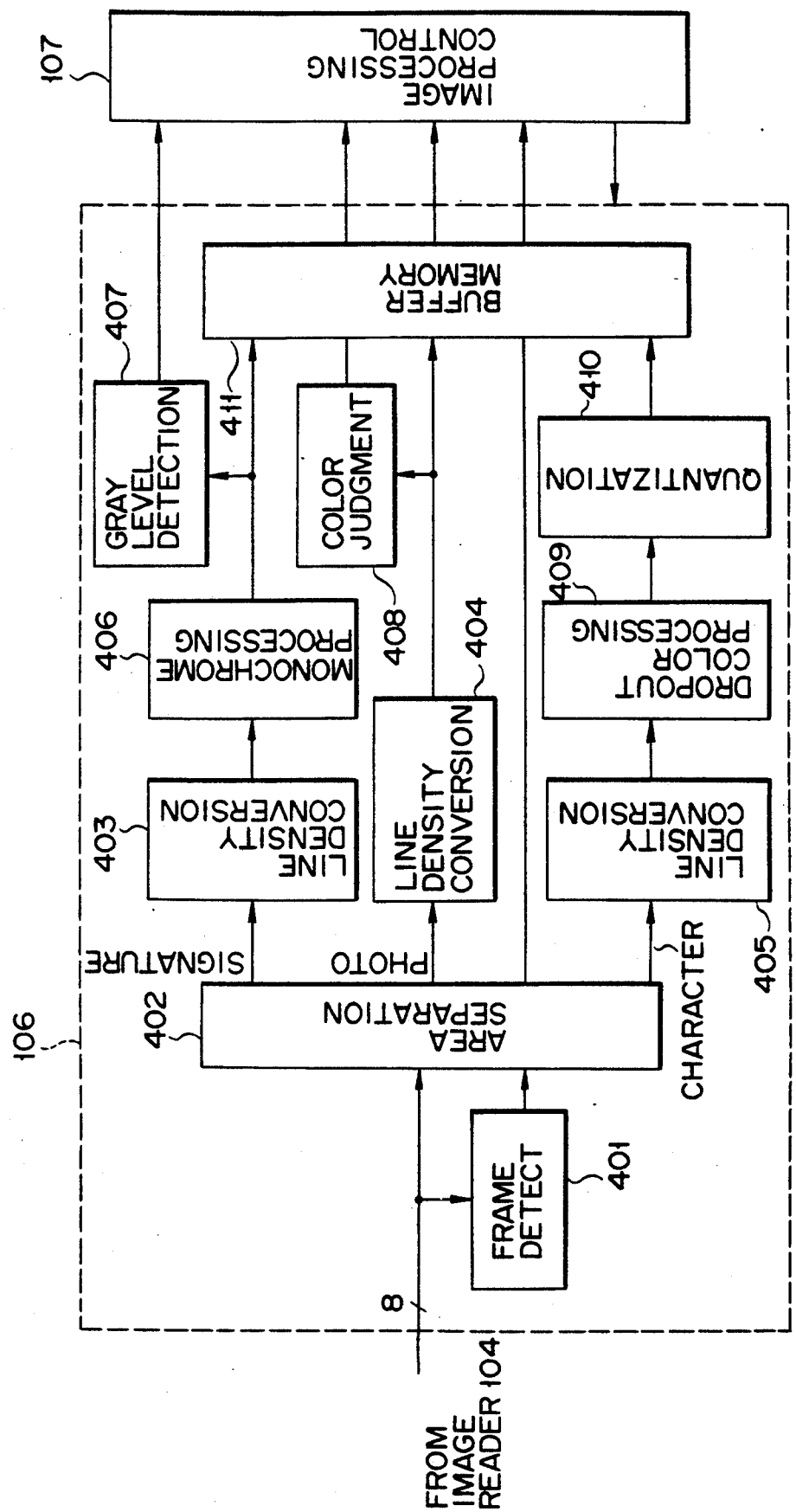
FIG. 4 is a block diagram of the input image processing unit of FIG. 1.

The input image processing unit 106 comprises, as illustrated in FIG. 4, a frame detecting circuit 401, an area separation circuit 402, linear density conversion circuits 403, 404 and 405, a monochrome-version processing circuit 406, a density detecting circuit 407, a color judgment circuit 408, a dropout color processing circuit 409, a quantization circuit 410 and a buffer memory 411. The frame detecting circuit 401 detects the extent (frame) of each area which is needed for area separation in the area separation circuit 402 to produce frame signals for each of the areas. The area separation circuit 402 separates image signals from the areas 201, 202 and 203 of the application form 100 in accordance with the frame signals so that the image signals are output onto different signal lines. The area separation circuit 402 can be implemented by a changeover circuit which is controlled by the frame signals.

Figure 5:
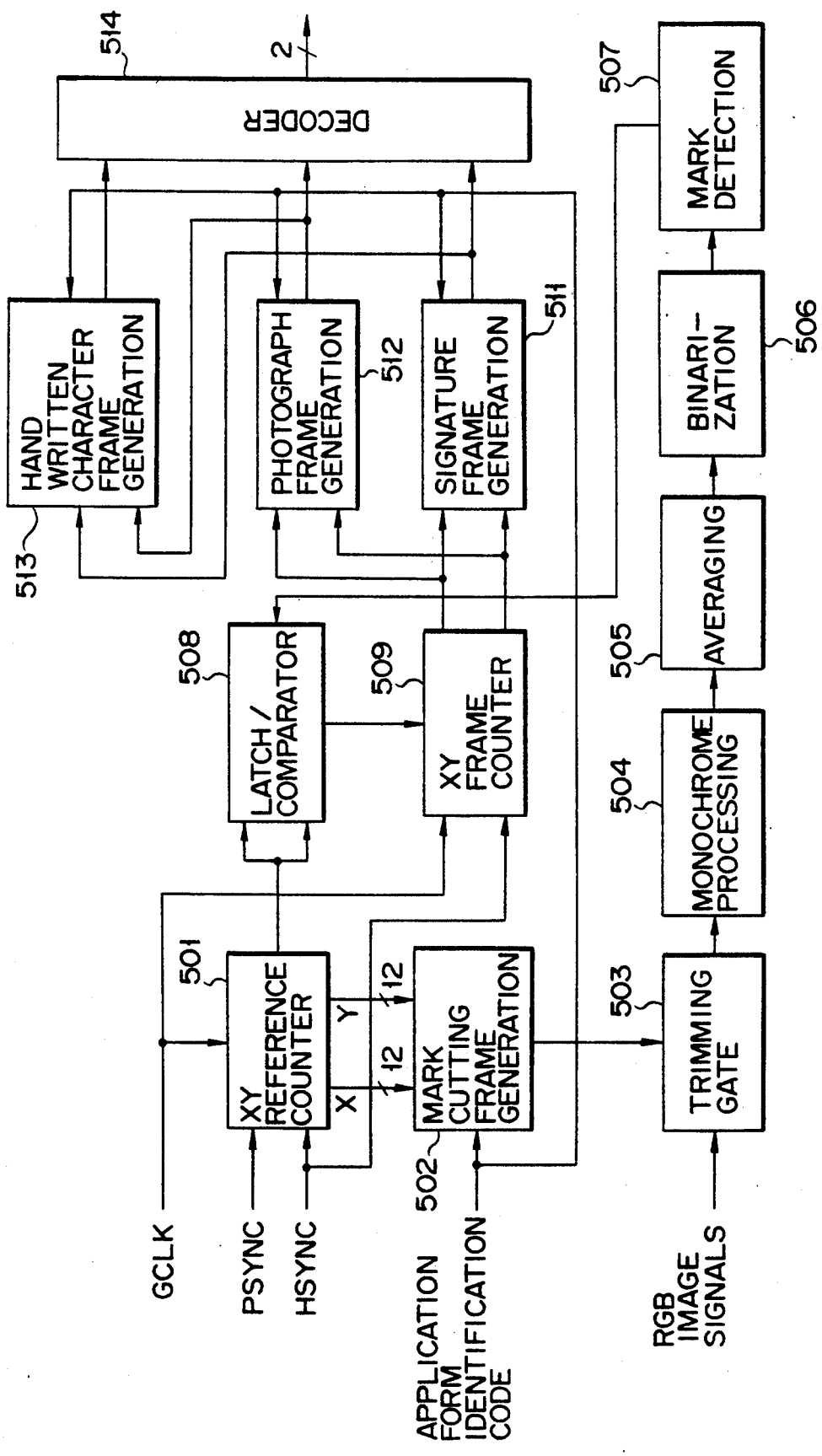
FIG. 5 is a block diagram of the frame detector circuit of FIG. 4.

FIG. 5 illustrates an arrangement of the frame detecting circuit 401. The frame detecting circuit 401 is supplied with the dot-sequential RGB image signals from the image reader 104, a pixel clock GCLK synchronized with pixel data of the RGB image signals, sync signals HSYNC and PSYNC which are synchronized with the main scanning and subscanning, respectively, at the image reader 104, and the above-described application form identification code from the main controller 101 via the image processing control unit 107. The sync signal PSYNC is produced on the basis of an application-form's-tip detect signal which is produced by an application form sensor (not shown) installed in the image reader 104 and used as a process start signal for the input image processing unit 106 An XY reference counter 501 comprises an X counter which counts the pixel clock GCLK using the main scanning sync signal HSYNC as a count start signal to thereby obtain coordinate data in the main scanning direction and a Y counter which counts the main scanning sync signal HSYNC using the subscanning sync signal PSYNC as a count start signal to thereby obtain coordinate data in the subscanning direction. The XY reference counter 501 produces coordinate data corresponding to each pixel of the input RGB image signals. Each of X, Y coordinate data is represented by 12-bit digital data.

A mark-cutting-frame generator 502 finds the format of the application form on the basis of the application form identification code and sequentially produces frame signals for cutting out signals for the reference marks 205 and 206 of FIG. 2 corresponding to the format from the RGB image signals in accordance with the coordinate data from the XY reference counter 501, the frame signals being applied to a trimming gate circuit 503 as a gate signal. The mark-cutting-frame generator 502 is comprised of a PLD (programmable logic device, for example, GAL16V8 manufactured by Lattice Co.) or a ROM (read only memory). Mark cutting frames which have been set previously according to various formats of application forms are programmed in the PLD or written into the ROM. In view of positional reading accuracy of the image reader 104 and feeding accuracy of the feeding mechanism 301 including skew in particular, the positions and sizes of the mark cutting frames are set in such a way that only the marks 205 and 206 are surely encompassed within the frames. Specifically, the mark cutting frame has a size of, for example, about 8 mm square in the actual dimension of application form 100, which corresponds to 128 dots × 128 dots in the color image signals output from the image reader 104.

The trimming gate circuit 503 is responsive to such mark cutting frame signals to gate the RGB image signals. The gated RGB image signals are converted to a monochrome image signal by a monochrome-version processing circuit 504. The monochrome image signal is averaged by an averaging circuit 505 using, for example, a 2 by 2 matrix to remove noise and components at isolated points and then subjected to binarization in a binarization circuit 506 using a predetermined threshold. The resulting binary image signal is applied to a mark detecting circuit 507. The mark detecting circuit 507 determines the coordinate data of the marks 205 and 206 from the input binary image signal and supplies them to a latch/comparator 508 as reference coordinate data. The latch/comparator 508 latches the reference coordinate data and compares them with the coordinate data, which is updated in sequence, from the XY reference counter 501. When a coincidence occurs between the reference coordinate data and the coordinate data from the reference counter, the latch/comparator supplies a start signal to an XY frame counter 509. In response to the start signal the XY frame counter 509 starts counting the pixel clock GCLK and the main scanning sync signal HSYN. As a result, the XY frame counter 509 outputs read coordinate data based on the reference coordinate data.

The coordinate data from the XY frame counter 509 is input to a signature frame generation circuit 511 and a photograph frame generation circuit 512. The signature frame generation circuit 51 and photograph frame generation circuit 512 identify the format of the application form 100 on the basis of the application form identification code and respectively generate a signature frame signal and a photograph frame signal, which correspond to the format of the application form, in accordance with the read coordinate data from the XY frame counter 509. Each of the signature frame generation circuit 511 and photograph frame generation circuit 512 may be comprised of a PLD or a ROM. Data on frames (signature frame and photograph frame) of the signature area 202 and the photograph area 201 each of which differs in its position and size for each of formats of application forms are programmed in the PLD or written in the ROM in advance.

A handwritten character frame generation circuit 513 is adapted to regard portions other than the areas surrounded with the signature frame and the photograph frame of the whole area of the application form 100 as the character area 203 and produce a handwritten character frame signal representing the frame of the handwritten character area. The handwritten character area frame generation circuit 513 is likewise comprised of a PLD or a ROM in which frame data which differs for each of formats of application forms are programmed or stored in advance. The programmed or written data is read by the application form identification code, whereby data on a frame of the area other than the areas surrounded with the signature and photograph frames is generated as the character frame signal. For this reason, the frame signals from the signature frame generation circuit 511 and photograph frame generation circuit 512 are applied to the handwritten character frame generation circuit 513.

The frame signals from the signature frame generation circuit 511, photograph frame generation circuit 512 and handwritten character frame generation circuit 513 are input to a decoder 514 for conversion to a 2-bit code signal to distinguish three areas from one another. The RGB image signals from the image reader 104, which are time-series signals, cannot contain image signals from more than one area at the same time. Therefore, the code signal output from the decoder 514 has only to represent the area to which presently input RGB image signals belong.

In this way, the frame detection circuit 401 obtains reference coordinate data used to generate frame signals for the areas 201, 202 and 203 by combining trimming using fixed mark cutting frames set by the mark cutting frame generation circuit 502 and detection of the reference marks 205 and 206 from trimmed image RGB signals. Furthermore, noise and isolated points are removed by the averaging circuit 505 prior to the mark detection. This will provide an advantage that mark detection which is immune to disturbances, such as skew, noise, stain on application form 100, etc., can be made when the application form 100 is read by the image reader 104. The frame signals output from the frame detection circuit 401 are applied to the image processing control unit 107 as well as to the area separation circuit 402 of FIG. 4.

Figure 6:
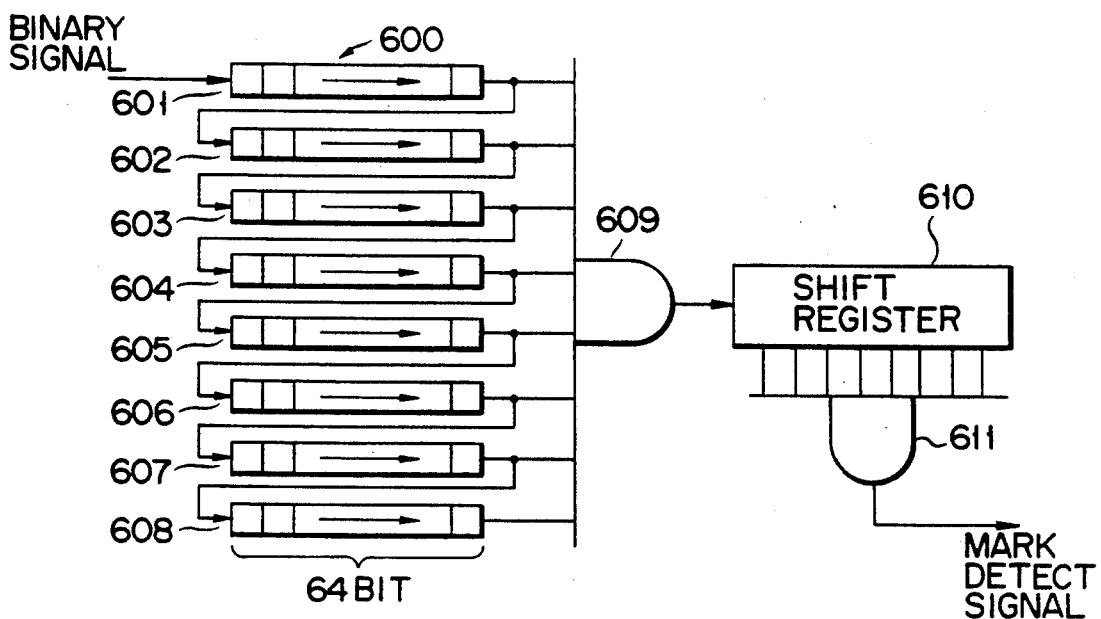
FIG. 6 is a block diagram of the mark detector circuit of FIG. 5.

The mark detection circuit 507 of FIG. 5 may be constructed as illustrated in FIG. 6. A binary image signal from the binarization circuit 505 is input in series to a 512-bit shift register 600 comprised of eight cascade-connected 64-bit shift registers 601 to eight cascade-connected 64-bit shift registers 601 to 607. The last-stage outputs of the 64-bit shift registers 601 to 608 are coupled to an AND gate 609 the output of which is coupled to the input of an 8-bit shift register 610. 8-bit outputs of the shift register 610 are coupled to an AND gate 611. When the last-stage outputs of the 64-bit shift registers 601 to 608 all go to a "HIGH" level, the output of the AND gate 609 goes to a "HIGH" level. When the output of the AND gate 609 continues to be at "H" level for eight bit times, all of bit outputs of the 8-bit shift register go to "H" level, causing the output of the AND gate 611 to go to "H" level. Whereby, a mark detect signal at a "H" level is output.

That is to say, the mark detection circuit 507 has an 8 dots×8 dots window for a binary image signal applied thereto. The input signal to the mark detection circuit 507 is a signal obtained by binarization a monochrome image signal (luminance signal) caused to have a dot density of 8 dots/mm by averaging of dots×2 dots in the averaging circuit 505. Thus, the window is 1 mm square in actual dimensions of the application form 100. When binary image signals within the window are all at a significant level, i.e., at a "H" level (black level), it is decided that the reference mark 205 or 206 is present within the window with the result that a mark detect signal is output.

Returning to FIG. 4, image signals from the areas 201, 202 and 203 from the area separation circuit 402 are applied to the line density conversion circuits 403, 404 and 405, respectively, where they are subjected to line density conversion at conversion magnifications suitable for their respective areas, that is, enlarged or reduced. The conversion magnifications for the image signals from the photograph area 201 and the signature area 202 are determined by the sizes of the areas 201 and 202 on the application form 100, the reading dot density of the image reader 104 (in this example, 16 dots/mm) and the recording format of the certificate 200 (the size of each area). The conversion magnification for the image signal from the character area 203 is determined by the reading dot density that the character recognition unit 105 requires. Plural conversion magnifications will be needed in order to accommodate plural recording formats.

Suppose that the image recording density of the printer 109 is 12 dots/mm, the photograph area 201 and the signature area 203 of the application form 100 are of the same size as corresponding respective areas of the certificate 200 and the reading dot density required by the character recognition density 105 is 8 dots/mm. In this case, the conversion magnifications of image signals from the photograph area 201 and signature area 202 will be 12/16=¾, and the conversion magnification of an image signal from the character area 203 will be 8/16=½. A general line density conversion process, which is performed combined with mechanical sub-scanning, will involve difficulties in implementing such two or more conversion magnifications simultaneously in real time. In the present embodiment, therefore, as will be described later, the line density conversion is performed electronically by the line density conversion circuits 403, 404 and 405 for each of the main scanning and sub-scanning directions.

Figure 8:
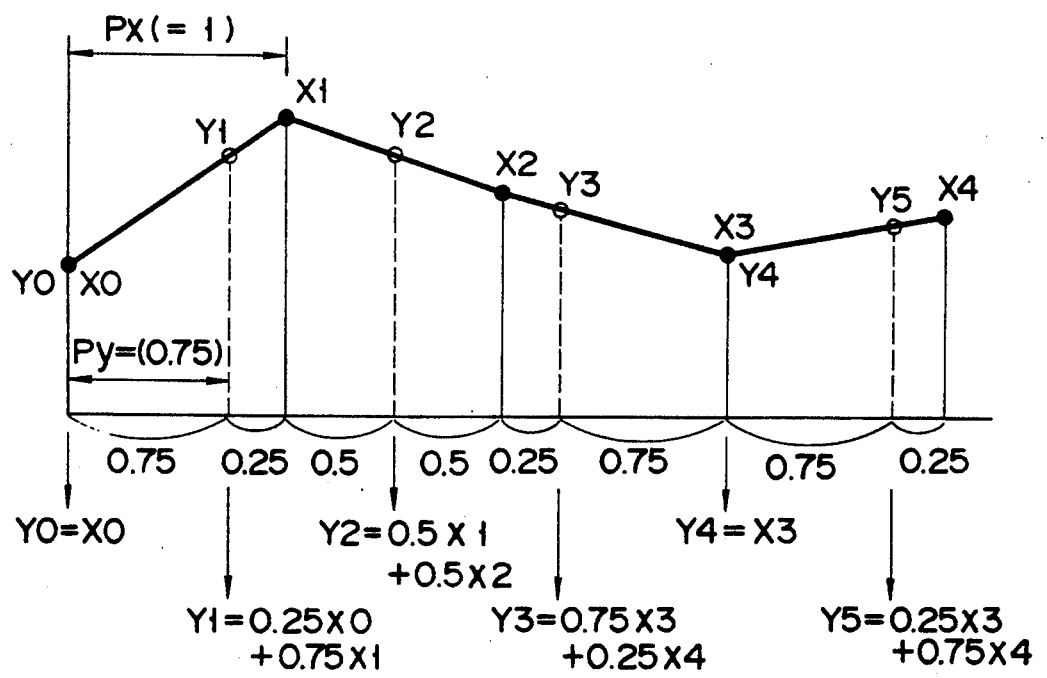
FIG. 8 is a diagram which is useful in understanding the principle of the line density conversion circuit of FIG. 7.

FIG. 7 illustrates an arrangement of a line density conversion circuit adapted to perform such a two-dimensional conversion process for the main scanning and sub-scanning directions. The line density conversion circuit is constructed from a selector 701, line memories 702 and 703, a memory controller 704, latches 701 and 706, a coefficient controller 707, coefficient multipliers 708, 709, 714 and 715, a buffer 710, adders 711 and 716 and three-stage latches 712 and 713. Each of the coefficient multipliers 708, 709, 714 and 715 is comprised of a coefficient ROM storing coefficient data and a multiplier for multiplying an input signal and a coefficient. The principle of the line density conversion circuit will be described with reference to FIG. 8.

Let an original image signal applied to the line density conversion circuit be X and its sampling interval Px be 1. Consider that the density of the original image signal X in the main scanning direction is multiplied by 0.75, in other words, the sampling interval Py of a line-density converted original image signal Py is made to be 0.75 Px. Suppose that the j-th (j≧0) pixel of the line-density converted image signal Y represents information in the 0.75 j position of the original image signal X. Suppose that the value $X_i$ for a sample of the original image signal that is below 0.75 j but closest to 0.75 j in position and the value $X_{i+1}$ for the next sample on right side are multiplied by coefficients of (i+1−0.75 j) and (0.75 j−1), respectively, and the sum of these products is the value Yj for the j-th pixel of the line-density converted image signal Y. The value $Y_1$ of the first pixel of the line-density converted image signal equals the sum of 0.25 times the value $X_0$ for the 0th pixel of the original image signal and 0.75 times the value $X_1$ for the first pixel of the original image signal. Such a line density conversion process is generalized by $$Y_j = (1-a)X_i + X_{i+1}$$

$$a = frac(j/R)$$

where frac stands for the decimal part of a numeric value of (j/R) and R stands for a magnification of the line density conversion. The above description relates to the principle of the line density conversion in the main scanning direction. The line density conversion in the sub-scanning direction can also be performed in accordance with the same principle.

The line density conversion circuit of FIG. 7 is constructed on the basis of such a principle. An input image signal is applied alternately to the line memories 702 and 703 via the selector 701 for each of lines in the main scanning direction and written therein under the control of the memory controller 704. The memory controller 704 is supplied with the pixel clock GCLK from the main controller 101 via the image processing control unit 107. The image signals which are read from the line memories 702 and 703, one pixel at a time, under the control of the memory controller 704 are applied to the coefficient multipliers 708 and 709 via the latches 705 and 706, respectively, to be multiplied by coefficients. Image signals which have been weighted by the coefficient multiplier 708 and 709 are added together by the adder 711, whereby the line density conversion in the sub-scanning direction is performed. The output of the adder 711 is applied to the first three-stage latch 712 via the buffer 710, while the output of the adder 711 is input to the second three-stage latch 713. The coefficient multiplier 714 is supplied with the output of the buffer 710 or the adder 711, while the coefficient multiplier 715 is supplied with the output of the three-stage latch 712 o 713. The image signals which have been multiplied by coefficients, i.e., weighted in the multipliers 714 and 715 are added together in the adder 716, whereby the line density conversion in the main scanning direction is performed. The coefficient data stored in the coefficient ROMs of the coefficient multipliers 708, 709, 714 and 715 are read in accordance with ROM address data from the coefficient controller 707, synchronously with the pixel clock GCLK, in a predetermined cycle. The coefficient controller 707 previously stores ROM address data and information on the cycle which are selected in accordance with the application form identification code and the frame signal which are supplied from the main controller 101 via the image processing controller 107. This allows the conversion magnification for the image signals from the photograph area 201 and signature area 202 to become ¾ and the conversion magnification for the image signal from the character area 203 to become ½ as described above.

Returning now to FIG. 4, the image signal from the signature area 202, which has been subjected to the line density conversion by the line density conversion circuit 403, is converted from RGB image signals to a monochrome image signal in the monochrome processing circuit 406. Regardless of the color ink used for signature on the signature area 202 of the application form 100, the signature area of the certificate 200 is printed in ink of a predetermined single color (for example, black or red). Therefore, since it is no use to process the RGB color image signals from the signature area 202 as they are, the color image signals are converted to a monochrome image signal by the monochrome processing circuit 406, thereby reducing the amount of information.

Figure 9:
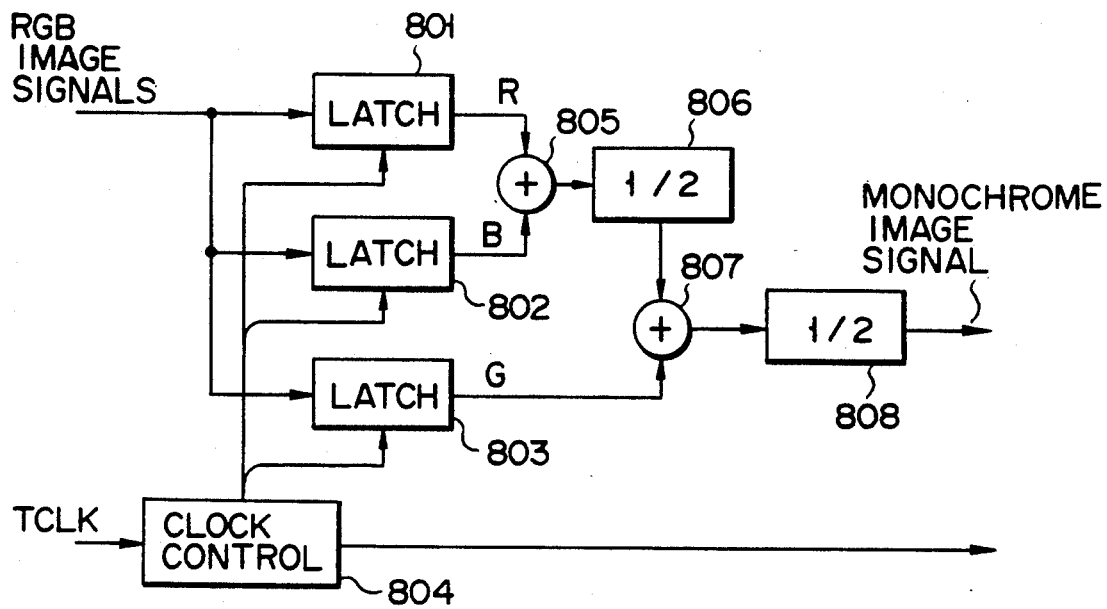
FIG. 9 is a block diagram of the monochrome-version processing circuit of FIG. 4.

FIG. 9 illustrates an arrangement of the monochrome processing circuit 406. The dot-sequential RGB image signals from the line density conversion circuit 403 are applied to latch circuits 801, 802 and 803. A clock controller 804 is adapted to shift the phase of the transfer clock TCLK (a clock the period of which is triple that of the pixel clock GCLK) from the image processing controller 107 to thereby produce a three-phase clock. The three parts of the three-phase clock are applied to the latches 801, 802 and 803, respectively. Consequently, by way of example, the R signal is held by the latch 801, the B signal is held by the latch 802 and the G signal is held by the latch 803. The R and B signals output from the latches 801 and 802 are added together in an adder 805 and the output of the adder is divided by two by an operation circuit 806. The output of the operation circuit 806 and the G signal output from the latch 803 are added together in an adder 807 and the output of the adder 807 is divided by two by an operation circuit 808. The output of the operation circuit 808 is a monochrome signal represented by $$0.5G + 0.25R + 0.25B$$

The reason why the weight for the G signal is great is that human eyes are more sensitive to green than to red and blue. Since the signals handled by the monochrome processing circuit 506 are digital signals, the divide-by-two operation performed by the operation circuits 805 and 807 can, in effect, be implemented by a bit shift operation and thus there is no need for a special circuit. Note that the monochrome processing circuit of FIG. 5 may also be constructed as in FIG. 9.

The image signal from the signature area 202 which has been converted to a monochrome signal in that way is applied to the gray level detection circuit 407 which detects the gray level of a signature image on the signature area 202. The gray level detection is needed for gray level compensation processing which allows a signature image printed on the certificate 200 to have a readable gray level with gradation retained and maximum recording density kept substantially constant independently of the gray level of the signature image on the signature area 202.

Figure 11:
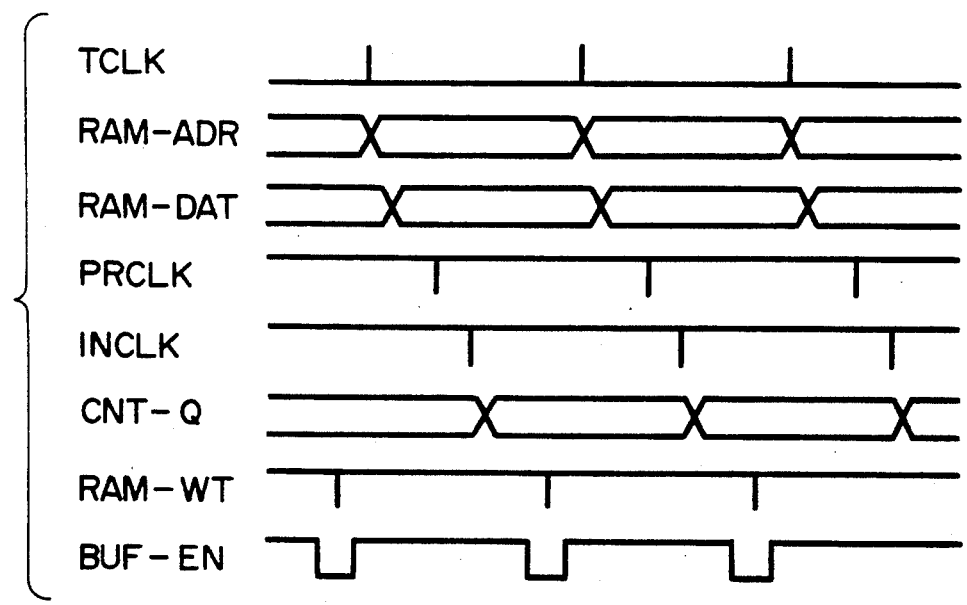
FIG. 11 is a timing diagram of signals at various portions of the gray level detecting circuit of FIG. 10.
Figure 10:
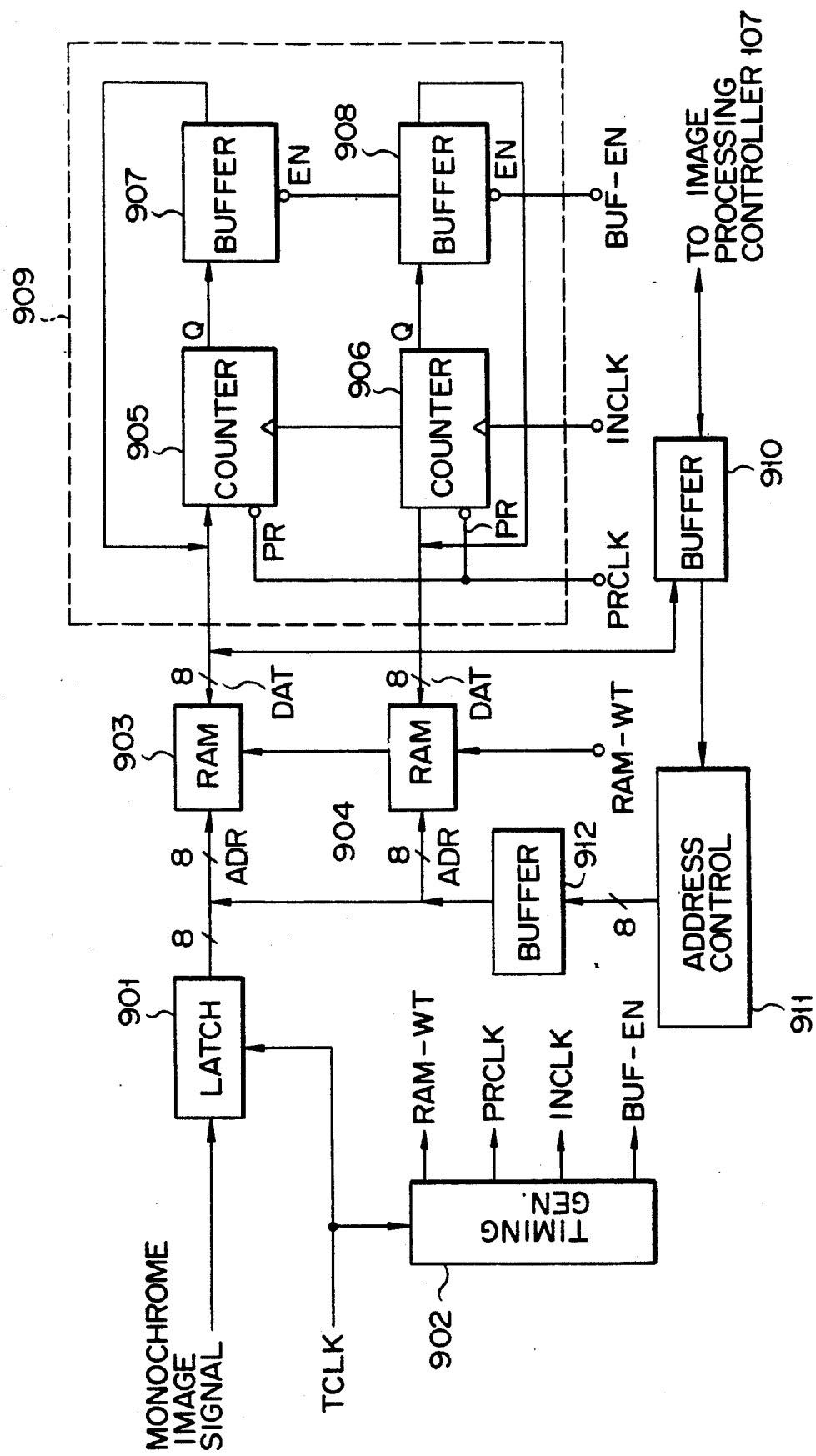
FIG. 10 is a block diagram of the gray level detecting circuit of FIG. 4.

As illustrated in FIG. 10, the gray level detection circuit 407 is constructed from a latch 901, a timing generator 902, RAMs (random access memories) 903 and 904, an incremental counter 909 comprised of counters 905 and 906 and buffers 910 and 912, buffers 910 and 912 and an address control circuit 911. FIG. 11 shows waveform diagrams of signals developed at various locations in FIG. 10.

The monochrome image signal from the monochrome processing circuit 406 is held by the latch 901 responding to the transfer clock TCLK from the image processing controller 107. The monochrome image signal is in turn applied to the RAMs 903 and 904 as address data RAM-ADR so that data stored in addresses designated by RAM-ADR are read from the RAMs 903 and 904. Read data RAM-DAT from the RAMs 903 and 904 are preset in the counters 905 and 906 by a preset clock PRCLK which is produced by the timing generator 902 in synchronism with the transfer clock TCLK. After this presetting, the contents of the counters 905 and 906 are incremented by one by an increment clock INCLK. The outputs CNT-Q of the counters 905 and 906 are input to the buffers 907 and 908, respectively. Subsequently, the timing generator 902 supplies an enable pulse BUF-EN to the buffers 907 and 908 and a write pulse RAM-WT to the RAMs 903 and 904 with the result that the contents of the counters 905 and 906 are written into the above addresses of the RAMs 903 and 904, respectively. Subsequently, the same operation as above is repeated.

Figure 12:
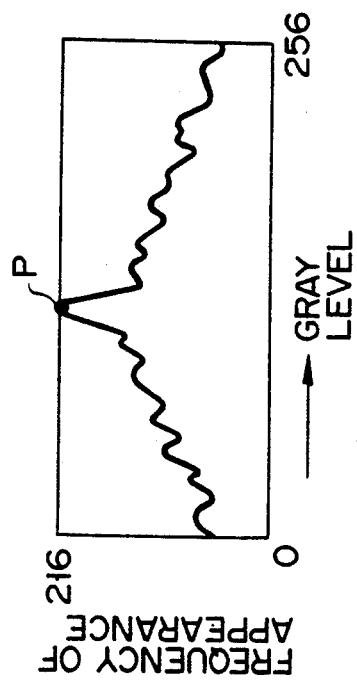
FIG. 12 illustrates a gray level histogram obtained by the gray level detecting circuit.

Each address of the RAMs 903 and 904, designated by the monochrome image signal, corresponds to a level (gray level) of the monochrome signal. Data stored in each address of the RAMs 903 and 904 indicates the frequency of appearance of a gray level corresponding to the address, which is obtained by the incremental counter 909. A level of the monochrome image signal corresponds to a gray level of the signature area 202. Thus, in each of the RAMs 903 and 904 is prepared such a gray level histogram of an image of the signature area 202 as shown in FIG. 12. When the preparation of the gray level histogram is terminated, address data is supplied from the address control circuit 911 to the RAMs 903 and 904 via the buffer 912 under the control of the image processing controller 107, whereby the contents of the RAMs 903 and 904 are read and transferred to the image processing controller 107 via the buffer 910. The RAMs 903 and 904 are cleared afterward.

The image processing controller 107 carries out a software-controlled gray level determining process on an image of the signature area 202 using the gray level histogram obtained by the gray level detection circuit 407. For the gray level determining process a peak P of the frequency of appearance in the gray level histogram of FIG. 12 is detected and the gray level range from zero level up to the peak level is divided to set determination levels of eight grades. The gray level of the monochrome image signal from the signature area 202 is determined in accordance with these determination levels and the result of determination is output to the main controller 101 as a 2-bit digital code.

Returning to FIG. 4, the RGB image signals from the photograph area 201 which have been converted by the line density conversion circuit 404 are stored in the buffer memory 411 as they are and input to the color judgment circuit 408. In the color judgment circuit 408 a judgment is made as to whether the photograph attached to the photography area 201 is colored or monochrome. The color judgment is needed in improving the quality of photograph printing made by the printer 109. For color printing four-color printing is generally used which employs, as colors of ink, BK (black) in addition to three colors of Y (yellow), M (magenta) and C (cyan). In the present embodiment, as a recording system of the printer 109, a recording system for photograph and signature images in particular, a thermal sublimation transfer system, which can obtain high picture quality like a photograph, is employed among electronic printing systems which are mandatory requirements for atomization and online processing. With the thermal sublimation transfer system a dye of pure black is difficult to obtain. Thus, a method of making the superimposition of Y, M and C ink upon one another correspond with achromatic printing has been used conventionally. Where such superimposition of ink is employed, it is difficult to keep color reproducibility and achromatic reproducibility compatible because of difficulties involved in obtaining optimum ink characteristics and the property of printing paper. Therefore, optimum parameters for color conversion processing which takes reproduction of full color images seriously and optimum parameters for color conversion processing which takes reproduction of monochrome photographies seriously are used to improve the reproducibility of a photographic image. The color conversion process here refers to a conversion process from RGB image signals which are color image signals of a first color system to YMC image signals (ink amount signals) which are color image signals of a second color system. In the present embodiment this is one of the functions of the output image processing unit 107. The color judgment signal is used to switch between the parameters.

Figure 13:
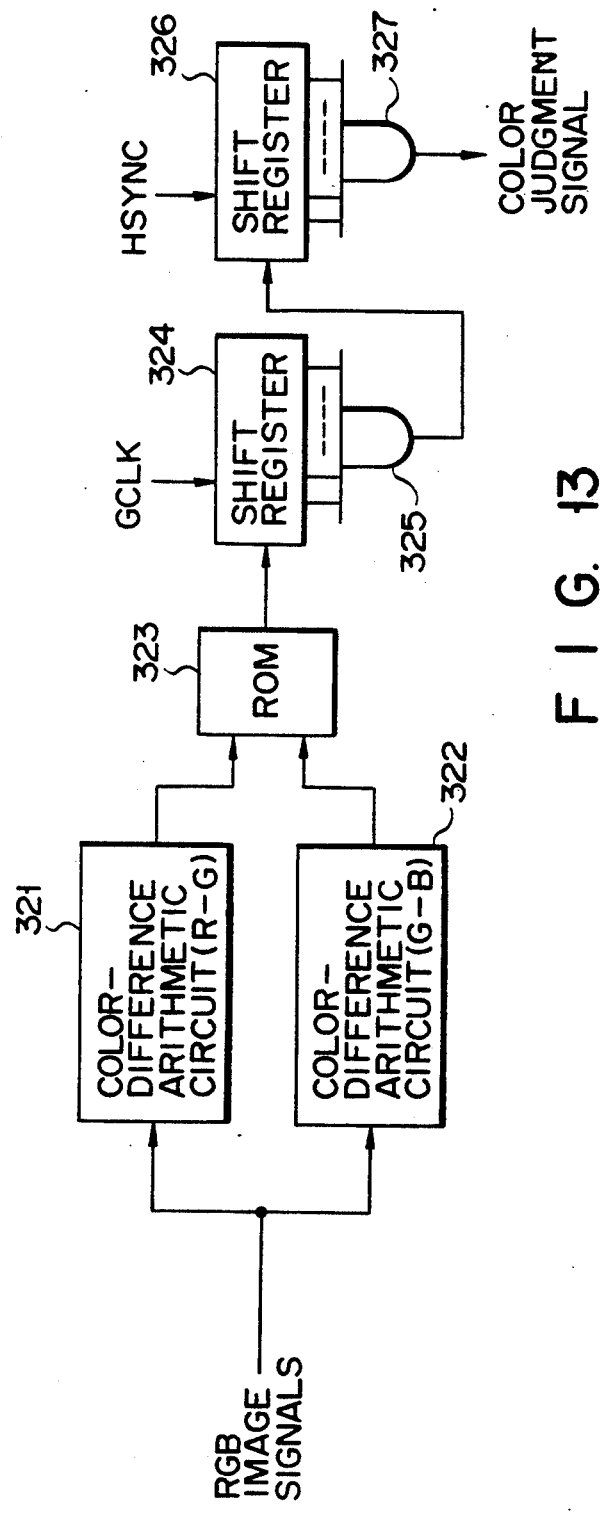
FIG. 13 is a block diagram of the color judgment circuit of FIG. 4.

As illustrated in FIG. 13, the color judgment circuit 408 is constructed from color-difference arithmetic circuits 321 and 322, a ROM 323, shift registers 324 and 326 and AND gates 325 and 326. The color-difference arithmetic circuits 321 and 322 produce color-difference signals of R-G and G-B, respectively. The color judgment circuit 408 determines a predetermined threshold in a color space represented by the color-difference signals R-G and G-B and makes color judgment on a dot-by-dot basis using the threshold. The ROM 323 produces 1-bit data at a "H" level when the value for the color-difference signals R-G and G-B applied thereto as an address signal is the threshold or more, otherwise the ROM produces 1-bit data at a "L" level. The output at a "H" level indicates that a corresponding pixel is in color. The shift register 324 has, for example, a 12-bit configuration and shifts outputs of the ROM 323 serially in response to the pixel clock GCLK from the image processing controller 107. The shift register 324 and AND gate 325 examine whether or not the ROM 323 has determined that 12 consecutive pixels are in color. The shift register 326 likewise has a 12-bit configuration and shifts outputs of the AND gate 325 serially in response to the main scanning sync signal HSYNC from the image processing controller 107. The shift register 326 and AND gate 327 examine whether or not the shift register 324 and AND gate 325 have determined that 12 consecutive lines are in color, thereby providing a color judgment signal. On the application form 100, 12 dots × 12 lines correspond to an area of approximately 1 mm². Thus, when a color-signal portion has an area of 1 mm² or more, the color judgment signal indicates a result of judgment that a photograph on the photograph area 201 is a color photograph. The color judgment signal from the color judgment circuit 408 is transferred to the output image processing unit 108 via the image processing controller 107.

When the color judgment signal transferred to the output image processing unit 108 indicates that the photograph is a color photograph, it is printed in color by the printer 109.

The image signal from the character area 203, which has been subjected to conversion in the line density conversion circuit 405, is preprocessed by the dropout color processing circuit 409 and quantization circuit 410 for recognition process in the character recognition unit 105. By utilizing a fact that the degree of freedom of choice of ink colors for use with the application form 100 is high because of the use of a color image sensor in the image reader 104, the dropout color processing circuit 409 is adaptable to plural application forms with different dropout colors by selecting a plane of each of R, G and B image signals. For example, a blue system and an orange system are employed as the dropout colors. Optimization is performed such that the blue system is drop out when the B signal is selected and the orange system is drop out when the R signal is selected. The image signal from the character area, which has been processed by the dropout color processing circuit 409, is quantized to one of, for example, four-valued levels in conformity with the specifications of the character recognition unit 105 and then stored in the buffer memory 411. In this way the results of processing of the image signals from the signature area 202, photograph area 201 and character area 203 are stored in the buffer memory 411.

Figure 14:
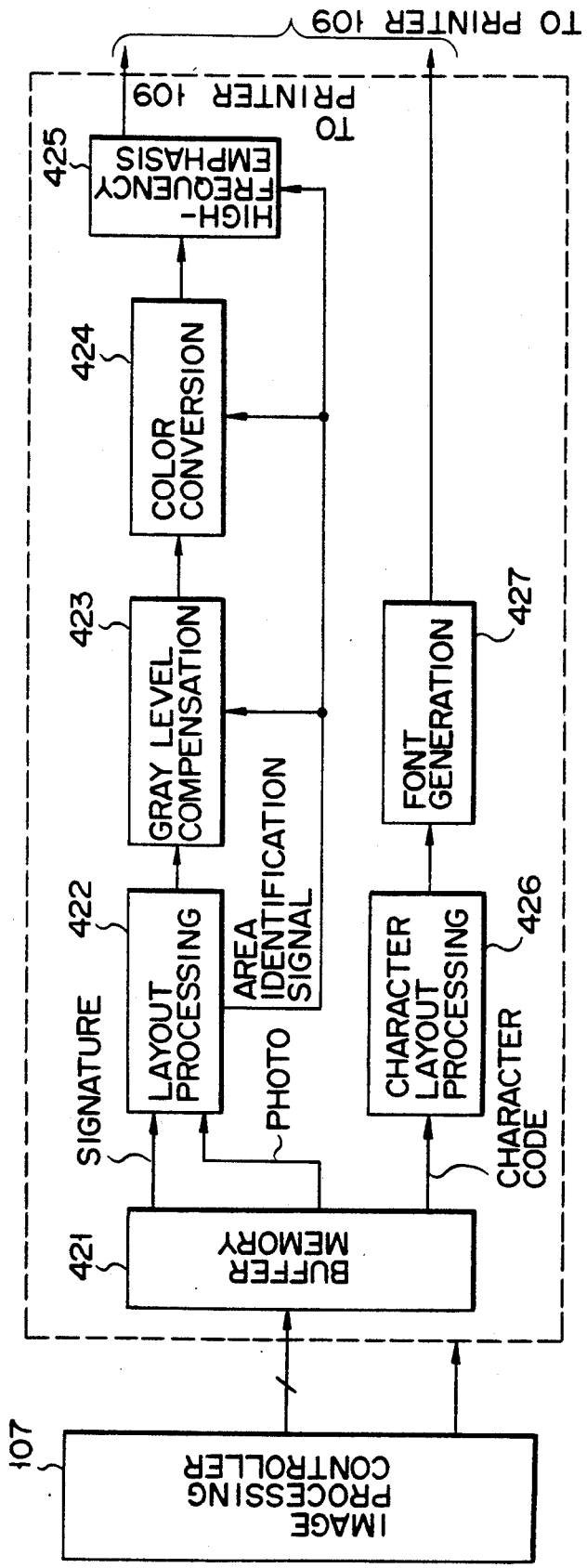
FIG. 14 is a block diagram of the output image processing unit of FIG. 1.

As illustrated in FIG. 14, the output image processing unit 108 is constructed from a buffer memory 421, a layout processing circuit 422, a gray level compensation circuit 423, a color conversion circuit 424, a high-frequency emphasizing circuit 425, a character layout processing circuit 426 and a font generation circuit 427. The output image processing circuit 108 processes the image signals from the photograph area 201 and signature area 202 and the image signal from the handwritten character area 203 separately for transmission to the printer 109. That is, the image signals from the photograph area 201 and signature area 202, which are output from the image processing controller 107 via the buffer memory 421 as bit map data, are entered into the layout processing circuit 422 and subjected to layout processing according to the layout of the photograph area and signature area of the certificate 200. The layout processing is performed to set the position and size of printing. The image signals processed by the layout processing circuit 422 are then subjected to gray level compensation processing in the gray level compensation circuit 423 which is prompted by the image processing controller 107. The layout processing circuit 422 generates an area identification signal for distinguishing between the photograph area 201 and the signature area 202 simultaneously with the layout processing.

Figure 15:
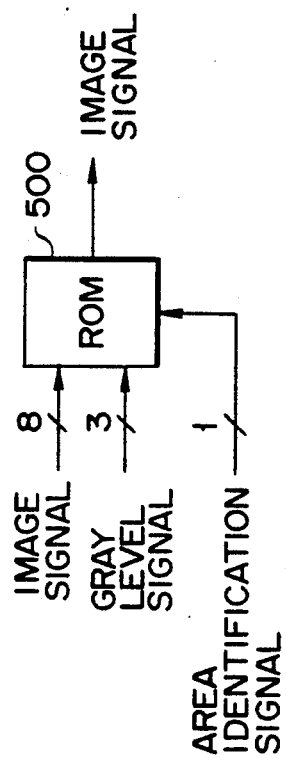
FIG. 15 is a block diagram of the gray level compensation circuit of FIG. 14.

The gray level compensation circuit 423 is comprised of a ROM 500 as illustrated in FIG. 15. In the ROM 500 are stored 16 gray level compensation curves. One of the compensation curves is selected in accordance with a 3-bit gray level determination signal for the signature area 202 and a 1-bit area identification signal. The layout-processed image signals from the layout processing circuit 422 are compensated in accordance with the selected gray level compensation curve and then output. More specifically, the gray level determination signal, the area identification signal and the image signal are applied to the ROM 500 as its address input signal and an image signal which has been compensated in accordance with the gray level compensation curve is output from the ROM 500. Whereby, the gray level compensation can be made in such a way that recording is performed at the printer 109 with its maximum recording density kept substantially constant without degrading the gradation of printing.

The image signal subjected to the gray level compensation in the gray level compensation circuit 423 is applied to the color conversion circuit 424. The color conversion circuit 424 converts the RGB image signals which are color image signals of the first color system to YMC image signals which are color image signals of the second color system. For this color conversion process, function type of process may be used for optimum conversion, which changes parameters for each of a color photograph, a monochrome photograph and a signature. To implement the color conversion circuit 424, various known methods including a LUT (lookup table) method using a ROM, a nonlinear conversion method and a masking-equation method may be used.

The YMC image signals from the color conversion circuit 424 are subjected, by the high-frequency emphasis circuit 425, to high-frequency emphasis compensation for an MTF (modulation transfer function) of the image reader 104 and improvement of the ease in seeing the result of printing by the printer 109. The high-frequency emphasis circuit 425 is supplied with the area identification signal from the layout processing circuit 422 so that an optimum emphasis coefficient is switched between the photograph area 201 and the signature area 202. An output signal of the high-frequency emphasis circuit 325 is supplied to the printer 109 as photograph-/signature data.

On the other hand, the image signal from the handwritten character area 203, which is output from the image processing controller 107 as character code data, is applied to the character layout processing circuit 426 via the buffer 421 to be subjected to layout processing according to the layout of the character area of the certificate 200. The image signal processed by the character layout processing circuit 426 is expanded by the font generation circuit 427 to bit map data (font data) corresponding to printing dots on the certificate 200. The bit map data is supplied to the printer as character image data.

Figure 16:
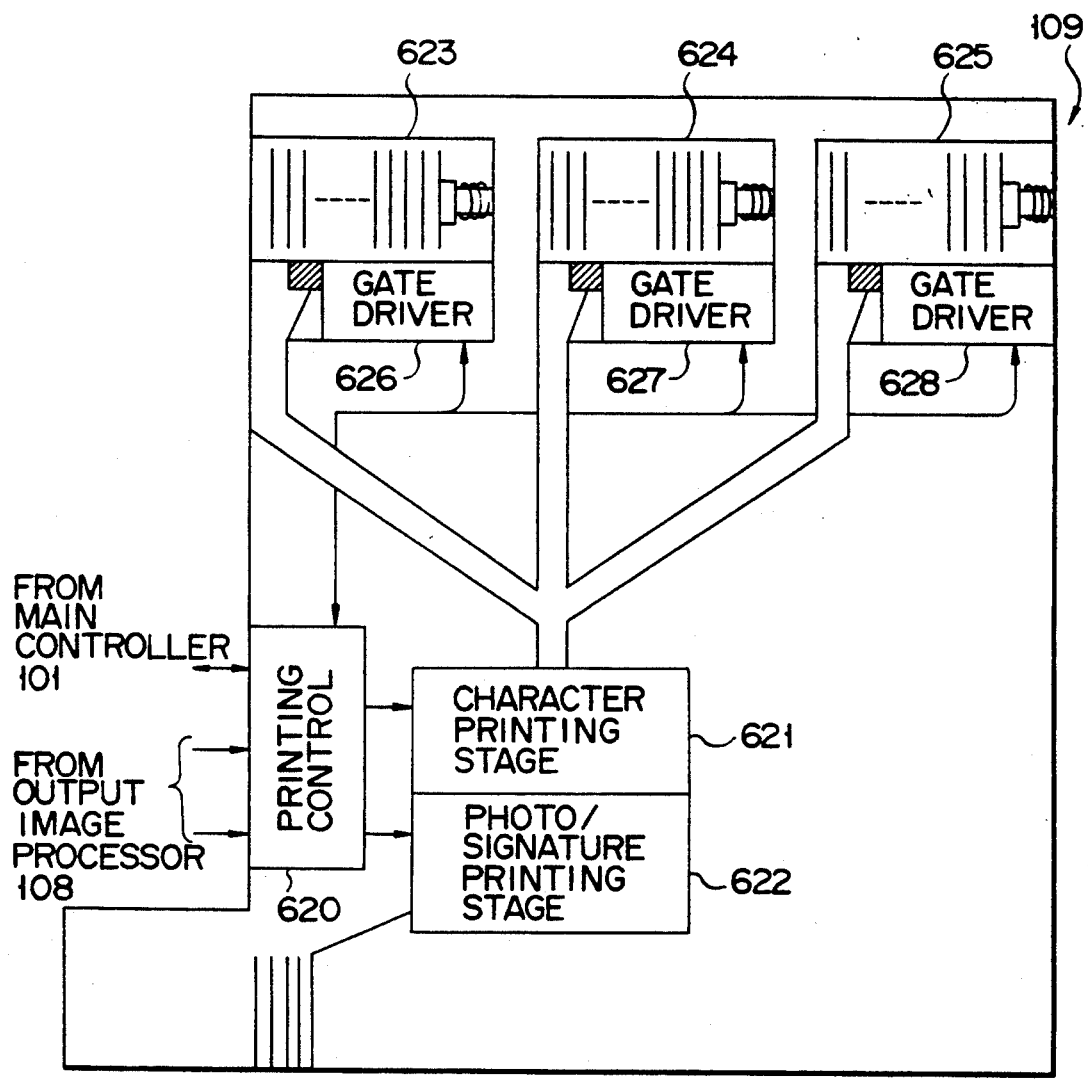
FIG. 16 is a schematic illustration of the printing unit of FIG. 1.

As illustrated in FIG. 16, the printer 109 of FIG. 1 is provided with a photograph/signature image printing stage 621 and a character printing stage 622 which respectively p int photograph/signature images and character images serially. The printing stage 621 receives the photograph/signature image data from the output image processing unit 109 via a controller 620 of the printer 109 and prints it by means of the thermal sublimation transfer system using YMC ink as described above. The printing stage 622 receives the character image data from the output image processing unit 108 via the controller 620 and prints it by means of an electrosensitive transfer system. The reason why the electrosensitive transfer system is used for printing character images is that the result of printing by an ink ribbon can readily be read by an infrared OCR (optical character reader) and preservable ink which is stable up to high temperature can be used. A security system, where characters printed on the certificate 200 can be checked by an infrared OCR, will provide many advantages. The printer 109 is provided with three trays 623, 624 and 625 in which plural kinds of printing paper differing in printing format and color can be set. The trays 623, 624 and 625 ar provided with gate drivers 626, 627 and 628, respectively, which are controlled by the main controller 101 through the printing controller 620. The main controller 101 recognizes the working item and the contents of the application form 100 (for example, the sex of an applicant) which are decided by the application form to send a signal for specifying the kind of printing paper to the printing controller 620.

The input image processing unit 106 has the buffer memory 411 at its output stage, while the output image processing unit 108 of FIG. 14 has the buffer memory 421 at its input stage. Such a double buffer configuration will permit a multitask process for an input/output operation, thereby improving efficiency in operator's checking and correcting work and facilitating the construction of an online system for credit inquiry, for example.

The image entry unit 111 of FIG. 1 is adapted to enter image information other than images on the application form 100 and may be a device for reading image information previously recorded on a medium and entering it into the present system, such as a FDD (floppy disk device), an ODD (optical disk device), an MT (magnetic tape device) or an IC (integrated circuit) card reader, or a device for receiving image information transmitted over a communication line and entering it into the system. The image information handled by the image entry unit 111 may take various forms such as a form in which facial image information and signature image information are expanded to a bit map, a form in which character information is represented by a digital code or a form in which the bit map and the digital code are mixed.

Information obtained by processing image information from the image reader 104 in the same manner as above and information obtained by processing image information from the image entry unit 111 can be sent to the printer 109 to be printed on the certificate 200. For example, the photograph area is omitted and the image reader 104 reads only the signature area and the handwritten character area to provide image signals for these areas. The face of an applicant is photographed by an electronic still camera or a video camera and the resulting facial image information is stored in one of such mediums as described above. The stored facial image information is then read by the image entry unit 111 and then transmitted to the main controller 101

The certificate preparing system of the present invention involves no photograph taking step and moreover can process all information to be printed on a certificate at the same time. Therefore, a certificate of a predetermined recording format can be prepared and issued in a short time. Even if image information recorded on any type of recording medium is reproduced and entered, the same effect will result. In addition, in the present invention, the face of an applicant is recorded on a certificate by use of image information obtained by reading a facial photograph on an application form or image information entered by the applicant. In either case, the applicant will have no mental dissatisfaction with an unpleasant expression because a facial image that the applicant can choose is printed on the certificate.

Additional advantages and modifications w 11 readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A system for recording an image having a facial image and ID information in a predetermined recording format, comprising:

a form having a format which includes an area for the facial image, an area for a monochrome image constituting a part of the ID information, an area for a character image constituting the other part of the ID information, reference marks for specifying reference coordinates of at least two of said facial image area, said monochrome image area, and said character image area and identification marks for identifying the format;

image reading means for reading the images on the form to output image signals from said areas;

processing means for identifying the format of said form based on said identification marks, and for processing the image signals of said areas output from said image reading means to fit said recording format, in according with the specified reference coordinates and the identified format of said form; and recording means, responsive to image signals processed by said processing means, for recording the facial image, the monochrome image and the character image.

2. A system according to claim 1, wherein said image reading means is arranged to read the image on said form while changing read coordinates sequentially and said reference mark, and said processing means comprises mark detecting means for detecting a signal from said reference mark by said image signal output from said image reading means, means for obtaining said read coordinates based on said reference coordinates provided by the detected signal from said reference mark, means responsive to the obtained read coordinates and identification information on the format of said form for generating frame signals indicating respective frames of said areas, and means for separating an image signal output from said image reading means into signals from said area using said frame signals.

3. A system according to claim 2, wherein said mark detecting means comprises means for generating frame signals indicating frames encompassing said reference marks using said identification information, means for cutting out image signals from areas encompassed by said frames from the image signal output from said image reading means by use of the frame signals, and means, having a window set for the cut out image signals, for detecting said reference marks by examining whether or not the image signals contained in said window are all at a significant level.

4. A system according to claim 1, wherein said processing means includes means for laying out each of the image signals from said areas output from said image reading means to fit the recording format in said recording means.

* * * * *